(12) United States Patent
Peng

(10) Patent No.: US 9,525,366 B2
(45) Date of Patent: Dec. 20, 2016

(54) ASYNCHRONOUS MOTOR AND METHOD FOR OPERATING AN ASYNCHRONOUS MOTOR

(71) Applicant: Kriwan Industrie-Elektronik GmbH, Forchtenberg (DE)

(72) Inventor: Xiaoming Peng, öhringen (DE)

(73) Assignee: Kriwan Industrie-Elektronik GmbH (DE)

( * ) Notice: Subject to any disclaimer, the term of this patent is extended or adjusted under 35 U.S.C. 154(b) by 132 days.

(21) Appl. No.: 14/546,378

(22) Filed: Nov. 18, 2014

(65) Prior Publication Data

US 2015/0137730 A1    May 21, 2015

(30) Foreign Application Priority Data

Nov. 18, 2013 (DE) .......................... 10 2013 112 692

(51) Int. Cl.
*H02P 1/44* (2006.01)
*H02P 25/04* (2006.01)

(52) U.S. Cl.
CPC ............... *H02P 1/445* (2013.01); *H02P 25/04* (2013.01)

(58) Field of Classification Search
CPC ................ H02P 1/42; H02P 1/44; H02P 1/445
USPC .................... 318/751, 752, 753, 754
See application file for complete search history.

(56) References Cited

U.S. PATENT DOCUMENTS

| 4,378,520 A * | 3/1983 | Ford | H02P 1/44 318/789 |
| 4,605,888 A * | 8/1986 | Kim | H02P 1/44 318/785 |
| 4,862,053 A * | 8/1989 | Jordan | H02P 1/44 318/785 |
| 2007/0057647 A1 | 3/2007 | Burkhart et al. | |

FOREIGN PATENT DOCUMENTS

DE        600 24 487 T2    7/2006
DE   10 2006 034 499 A1    1/2008

* cited by examiner

*Primary Examiner* — Bentsu Ro
(74) *Attorney, Agent, or Firm* — Renner Kenner Greive Bobak Taylor & Weber

(57) ABSTRACT

In a method for operating an asynchronous motor including a main winding and an auxiliary winding, a start capacitor is connected in series with the auxiliary winding before the asynchronous motor is started up and is disconnected at a point in time, which is to be determined, after the asynchronous motor is started up. The voltage of the auxiliary winding is measured and at least one mathematical model is used, which models the voltage amplitude of the voltage of the auxiliary winding in relation to time and includes at least one parameter of the dynamic process of the motor starting procedure, which is determined on the basis of the mathematical model and the course of the amplitude or the effective value of the measured voltage of the auxiliary winding, and the point in time for disconnecting the start capacitor is determined by means of the determined parameter.

12 Claims, 4 Drawing Sheets

ASYNCHRONOUS MOTOR AND METHOD FOR OPERATING AN ASYNCHRONOUS MOTOR

TECHNICAL FIELD

The invention relates to an asynchronous motor and to a method for operating an asynchronous motor.

BACKGROUND OF THE INVENTION

An asynchronous motor operated on the AC mains supply needs at least two phase-shifted voltages in order to create a rotating field. For this purpose, the asynchronous motor normally has a main winding and an auxiliary winding offset by 90°, the phase shift being achieved by a capacitor connected in series with the auxiliary winding.

The phase shift is a function of the capacitance of the capacitor and the speed of the asynchronous motor and determines its quiescent point. Operation at the incorrect quiescent point can lead to malfunctions and damage to the components or the machinery assigned thereto. It is therefore often necessary to perform a change to the capacitance of the capacitor in the start-up phase of the motor between the start-up and the nominal speed, the change in capacitance normally being achieved as follows:
1. The asynchronous motor is operated with a start capacitor and a run capacitor, the start capacitor being disconnected after the starting procedure, or
2. the asynchronous motor is operated with a start capacitor only, which is disconnected after the starting procedure.

The available torque must remain significantly greater than the load torque both before and immediately after the disconnection of the start capacitor for failure-free motor operation. In practice, it is standard to bring about the disconnection of the start capacitor using a centrifugal switch dependent on the motor speed, using a current relay dependent on the motor current, or after a predefined time.

Furthermore, a method is known from US 2007/0057647 A1, in which the phase shift between the voltage of the auxiliary winding and the voltage of the main winding is determined and the start capacitor is disconnected when the phase shift exceeds a specified value.

Moreover, a motor circuit for a single-phase alternating current induction motor, comprising a main winding, an auxiliary winding and a start capacitor, is known from DE 600 24 487 T2, the voltage of the auxiliary winding being measured and the disconnection of the start capacitor being initiated when the first derivative function of the measured voltage exceeds a specified threshold value.

SUMMARY OF THE INVENTION

The object of the present invention is to ensure trouble-free operation of the asynchronous motor that preserves the components with simplified switching and processing complexity.

In the case of the method according to the invention for operating an asynchronous motor comprising a main winding and an auxiliary winding, a start capacitor is connected in series with the auxiliary winding before the asynchronous motor is started up and is disconnected at a point in time, which is to be determined, after the asynchronous motor is started up in that the voltage, in that
the voltage of the auxiliary winding is measured,
at least one mathematical model is used, which models the voltage amplitude of the voltage of the auxiliary winding in relation to time and includes at least one parameter of the dynamic process of the motor starting procedure, the parameter of the dynamic process of the motor starting procedure being determined on the basis of the mathematical model and the course of the amplitude or the effective value of the measured voltage of the auxiliary winding, and
the point in time for disconnecting the start capacitor is determined by means of the parameter that has been determined.

The asynchronous motor according to the invention has a main winding, an auxiliary winding, a start capacitor and a control device, the control device being connected to a voltage measurement device for determining the course of the amplitude or the effective value of the measured voltage of the auxiliary winding and to a disconnecting device for disconnecting the start capacitor, the control device being configured to determine the point in time for disconnecting the start capacitor such that
the voltage of the auxiliary winding is measured,
at least one mathematical model is used, which models the voltage amplitude of the voltage of the auxiliary winding in relation to time and includes at least one parameter of the dynamic process of the motor starting procedure, the parameter of the dynamic process of the motor starting procedure being determined on the basis of the mathematical model and the course of the amplitude or the effective value of the measured voltage of the auxiliary winding, and
the point in time for disconnecting the start capacitor is determined by means of the parameter that has been determined.

Because only the voltage of the auxiliary winding is measured and processed, the complexity of switching and processing is simplified. Nevertheless, an optimal point in time for the disconnection of the start capacitor can be determined such that trouble-free operation of the asynchronous motor is ensured and possible damage to the asynchronous motor and equipment assigned thereto can be prevented. By using at least one mathematical model, which models the voltage amplitude of the voltage of the auxiliary winding in relation to time, the point in time for disconnecting the start capacitor can be determined so as to be more trouble-free and so as to better preserve the components.

The sub-claims relate to further configurations of the invention.

The parameter is preferably determined using the first and/or a further derivative function ($d^n U_H/dt^n$) of the course of the amplitude or the effective value of the measured voltage of the auxiliary winding.

According to a preferred embodiment, the first and second derivative functions ($dU_H/dt$, $d^2U_H/dt^2$) of the course of the amplitude or the effective value of the measured voltage of the auxiliary winding are determined and taken into account in order to determine the point in time for disconnecting the start capacitor.

Moreover, the first and second derivative functions ($dU_H/dt$, $d^2U_H/dt^2$) of the course of the amplitude or the effective value of the measured voltage of the auxiliary winding can be determined and taken into account in order to determine the point in time for disconnecting the start capacitor.

According to a further variant of the invention, the first, second and third derivative functions ($dU_H/dt$, $d^2U_H/dt^2$, $d^3U_H/dt^3$) of the course of the amplitude or the effective value of the measured voltage of the auxiliary winding are determined and taken into account in order to determine the point in time for disconnecting the start capacitor.

The at least one mathematical model applied for determining the point in time for disconnecting the start capacitor can be formed in particular by the following first mathematical model:

$$U_H = U_{H\infty} - (U_{H\infty} - U_{H0})e^{-t/\tau}$$

$U_{H0}$ being the starting value of the auxiliary voltage ($U_H$) at t=0, $U_{H\infty}$ being the final value of the auxiliary voltage ($U_H$) at t=∞. The time constant τ constitutes the parameter of the dynamic process of the motor starting procedure.

Alternatively or in addition to the first mathematical model, the following second mathematical model can be applied:

$$U_H = \sum_{i=0}^{n} a_i t^i,$$

n>2, $U_{H0}$ being the starting value of the auxiliary voltage ($U_H$) at t=0, $U_{H\infty}$ being the final value of the auxiliary voltage ($U_H$) at t=∞ and $a_i$ being constants.

In the process, the time constant τ of the first mathematical model can be determined by means of the first and second derivative functions ($dU_H/dt$, $d^2U_H/dt^2$) of the course of the amplitude or the effective value of the measured voltage of the auxiliary winding and used to determine the point in time for disconnecting the start capacitor.

When using the second mathematical model, at least one inflection point of the second mathematical model, which constitutes the parameter of the dynamic process of the motor starting procedure, can be determined and used by means of the first and the second derivative functions ($dU_H/dt$, $d^2U_H/dt^2$) of the course of the amplitude or the effective value of the measured voltage of the auxiliary winding (2). In this case, the inflection point of the course of the amplitude or the effective value of the measured voltage of the auxiliary winding can be determined by means of the maximum of the first derivative function ($dU_H/dt$) of the course of the amplitude or the effective value of the measured voltage of the auxiliary winding or by means of the negative zero crossing of the second derivative function ($d^2U_H/dt^2$) of the course of the amplitude or the effective value of the measured voltage of the auxiliary winding. Moreover, a break point in the course of the amplitude or effective value of the measured voltage of the auxiliary winding can be drawn upon in order to determine the point in time for disconnecting the start capacitor. In this case, the break point in the course of the amplitude or effective value of the measured voltage of the auxiliary winding can be determined by means of the minimum of the second derivative function ($d^2U_H/dt^2$) of the course of the amplitude or effective value of the measured voltage of the auxiliary winding or by means of the positive zero crossing of the third derivative function ($d^3U_H/dt^3$) of the course of the amplitude or effective value of the measured voltage of the auxiliary winding.

A deviation above or below a predefined threshold value of the derivative function to the $n^{th}$ order ($d^nU_H/dt^n$) of the course of the amplitude or the effective value of the measured voltage of the auxiliary winding can be used as a further criterion for disconnecting the start capacitor.

The first derivative function ($dU_H/dt$) of the course of the amplitude or the effective value of the measured voltage of the auxiliary winding can be used optionally to determine critical motor statuses, a critical motor status being reached if the first derivative function ($dU_H/dt$) of the course of the amplitude or the effective value of the measured voltage of the auxiliary winding in a predefined period of time from the start-up of the asynchronous motor has not exceeded a predefined threshold and/or the first derivative function ($dU_H/dt$) of the course of the amplitude or the effective value of the measured voltage of the auxiliary winding remains at <0 for a predefined period of time.

Furthermore, it is possible to determine a change in capacitance from activation of the start capacitor and the remaining useful life of the start capacitor by means of the change over time in the starting value of the course of the amplitude or the effective value of the measured voltage of the auxiliary winding.

Moreover, it is possible to determine a change in capacitance from activation of the run capacitor and the remaining useful life of the run capacitor by means of the change over time in the final value of the course of the amplitude or the effective value of the measured voltage of the auxiliary winding.

When the invention is put into practical use, the derivative function ($dU_H/dt$) can be used as a change in value over a predefined interval ($U_{H2} - U_{H1}$)/($t_2 - t_1$).

The control device of the asynchronous motor is preferably configured such that it comprises means to determine the first and/or further derivative functions ($d^nU_H/dt^n$) of the course of the amplitude or the effective value of the measured voltage of the auxiliary winding as well as means for determining the point in time to disconnect the start capacitor on the basis of the first and/or further derivative functions ($d^nU_H/dt^n$) of the course of the amplitude or the effective value of the measured voltage of the auxiliary winding. The disconnecting device for disconnecting the start capacitor is preferably formed by a relay of the closer type.

BRIEF DESCRIPTION OF THE DRAWINGS

Further embodiments of the invention are described hereinafter in more detail with reference to the description and the drawings, in which.

DETAILED DESCRIPTION OF THE INVENTION

Figure 1:
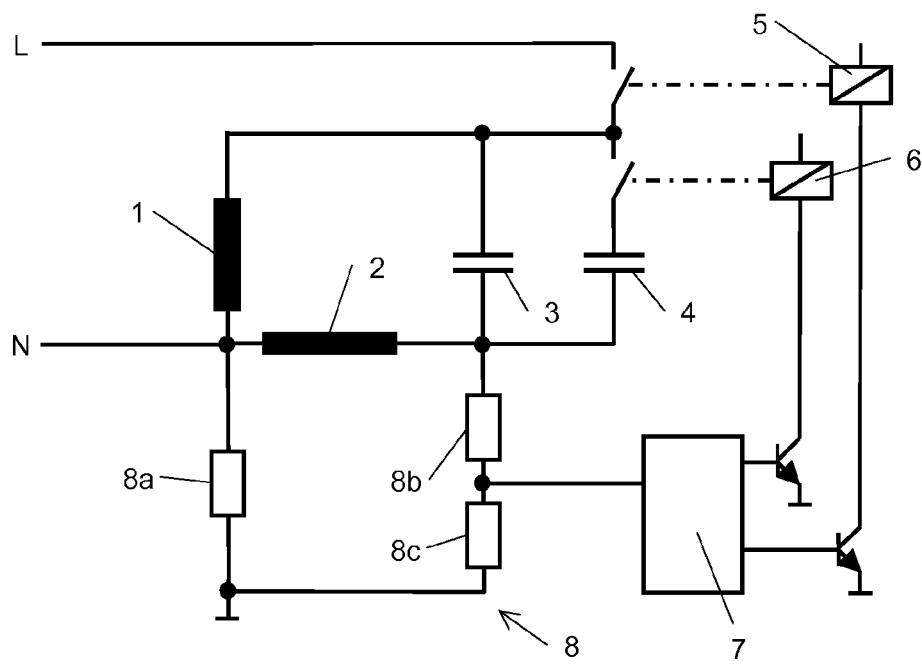
FIG. 1 is a wiring diagram of an asynchronous motor comprising a run capacitor and start capacitor.

The asynchronous motor shown in the wiring diagram according to FIG. 1 has a main winding 1, an auxiliary winding 2 spatially offset by 90° and two capacitors, namely a run capacitor 3 and a start capacitor 4. Furthermore, a first disconnecting device 5 for switching the asynchronous motor on and off is provided. Said disconnecting device is preferably formed as a relay of the closer type (NO) and serves to prevent the asynchronous motor from being switched on accidentally, which could, for example, occur in the event of a power failure. The capacitors and disconnecting devices used are thereby protected from damage caused by increased inrush currents, which could occur as a result of non-discharged capacitors. Furthermore, a second disconnecting device 6 for switching on and disconnecting the start capacitor 4 is provided. The second disconnecting device 6 is also preferably formed as a relay of the closer type (NO) and also prevents the motor from being switched on accidentally. The two disconnecting devices 5, 6 are controlled via a control device 7, which is connected to a voltage measurement device 8 formed by a network of high-impedance resistors 8a, 8b, 8c and serves to determine the course of the amplitude or the effective value of the measured voltage of the auxiliary winding.

Figure 2:
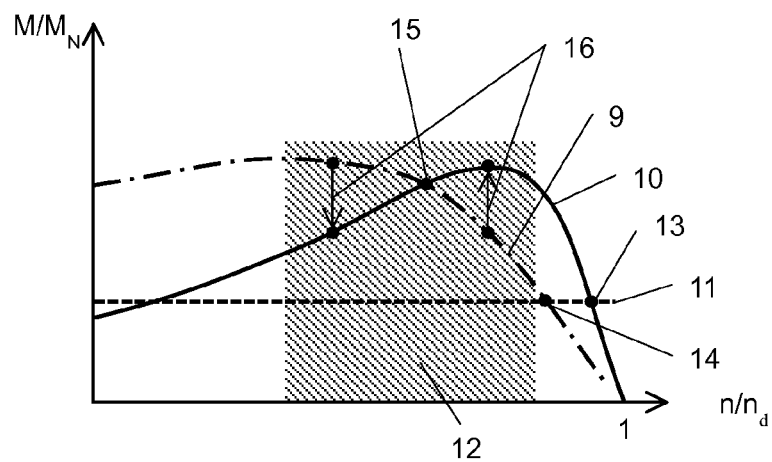
FIG. 2 shows the torque in relation to the speed for the asynchronous motor according to FIG. 1.

In FIG. 2 the characteristic curves for the normalised torque (based on the nominal torque $M_N$) compared to the normalised speed (based on the synchronous speed $n_d$) are plotted, the characteristic curve with the run and start capacitors switched on being denoted by the reference numeral 9 and the characteristic curve with the run capacitor and the disconnected start capacitor being denoted by the reference numeral 10. The load torque is assumed to be constant in order to simplify the illustration and is denoted by the reference numeral 11. It is a prerequisite for trouble-free motor operation that the available torque both before and immediately after disconnection of the start capacitor 4 remains significantly greater than the load torque 11. In FIG. 2 the speed range, in which this prerequisite for the disconnection of the start capacitor is met, is shown as a shaded effective disconnecting range 12. Furthermore, the motor's quiescent point with the run capacitor is denoted by the reference numeral 13 and the quiescent point with the start capacitor is denoted by the reference numeral 14.

The optimal point in time for disconnecting the start capacitor 4 is the intersection 15 of the two characteristic curves 9 and 10. In practice, the load torque 11 is normally dependent on the speed and the load which can in turn both vary. Moreover, the capacitance of most capacitors used for asynchronous motors changes with the operating conditions and time. A change in capacitance inevitably also leads to a change in the characteristic curves 9 and 10 and thus also to a change in the optimal point in time 15 for disconnecting the start capacitor. Usually therefore, changes in torque, which are shown in FIG. 2 by the arrows 16, will occur when the start capacitor is disconnected. As long as these changes take place within the effective disconnecting range 12 this does not pose a problem. Outside of this range, however, malfunctions or even a stoppage of the motor can occur.

Figure 3:
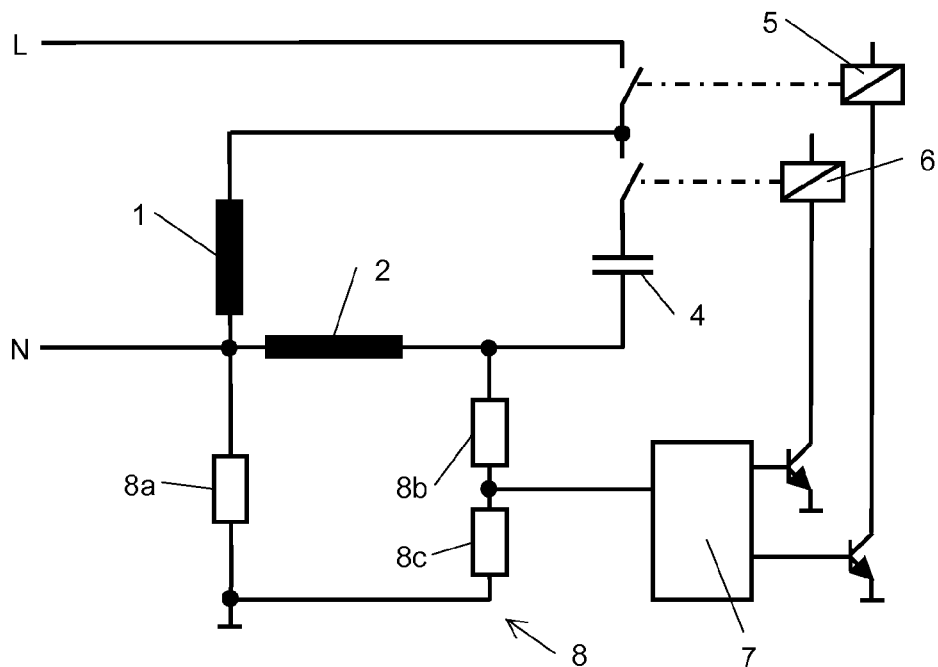
FIG. 3 is a wiring diagram of an asynchronous motor and start capacitor and without run capacitor.
Figure 4:
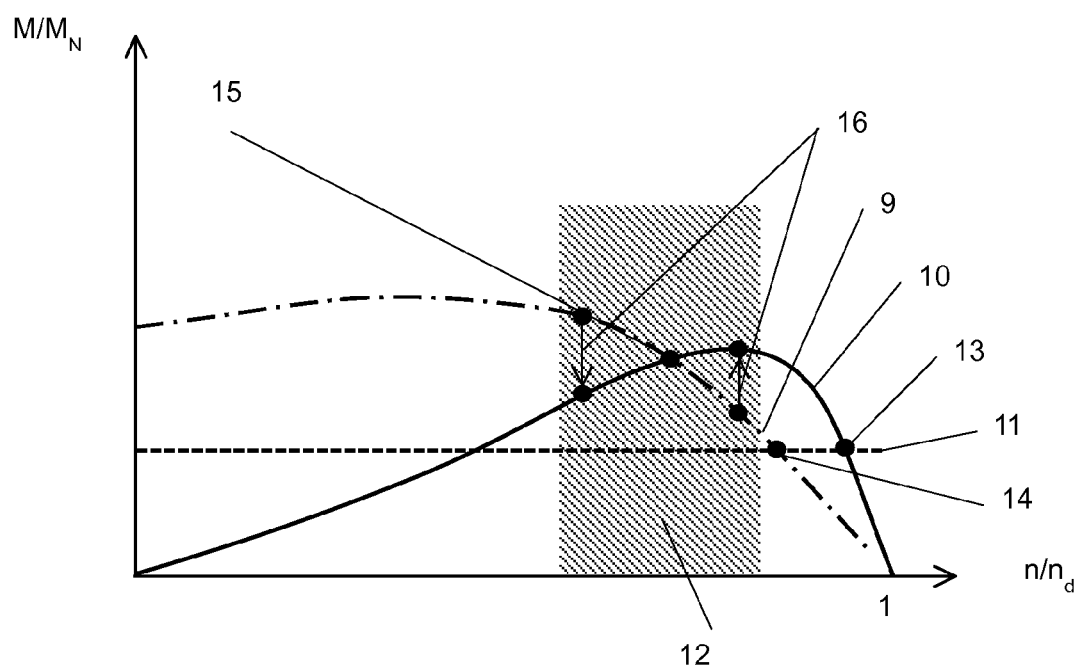
FIG. 4 shows the torque in relation to the speed for the asynchronous motor according to FIG. 3.

In FIG. 3, the wiring diagram of an asynchronous motor comprising a control device according to a second embodiment is shown, which only differs from the first embodiment in that there is no run capacitor 3. The same reference numerals have therefore also been used for the same components and corresponding characteristic curves in FIG. 4. It can also be seen that the effective disconnecting range 12 is significantly narrower for the embodiment according to FIG. 3. For this application it is therefore even more important to find the optimum point in time for disconnecting the start capacitor.

Two embodiments for determining the optimum point in time for disconnecting the start capacitor are described hereinafter in more detail.

The starting procedure of an asynchronous motor is a dynamic process, which transitions into a stable final operating state within a limited time. During the starting procedure the voltage amplitude $U_H$ of the auxiliary winding, the voltage amplitude $V_C$ at the capacitor, the current amplitude $I_H$ of the auxiliary winding, the current amplitude $I_C$ in each capacitor and the phase shifts between the voltages of the main and auxiliary windings and between the currents are each a function of time. Each of these functions reflects the course of the dynamic process. In the following embodiment, the voltage amplitude $U_H$ of the auxiliary winding is considered.

Firstly, a mathematical model for a practical description or simulation of the voltage $U_H$ (amplitude or effective value) of the auxiliary winding for the starting procedure of an asynchronous motor is generated. The mathematical model forms the basis for the method for controlling the starting procedure of an asynchronous motor.

Figure 5:
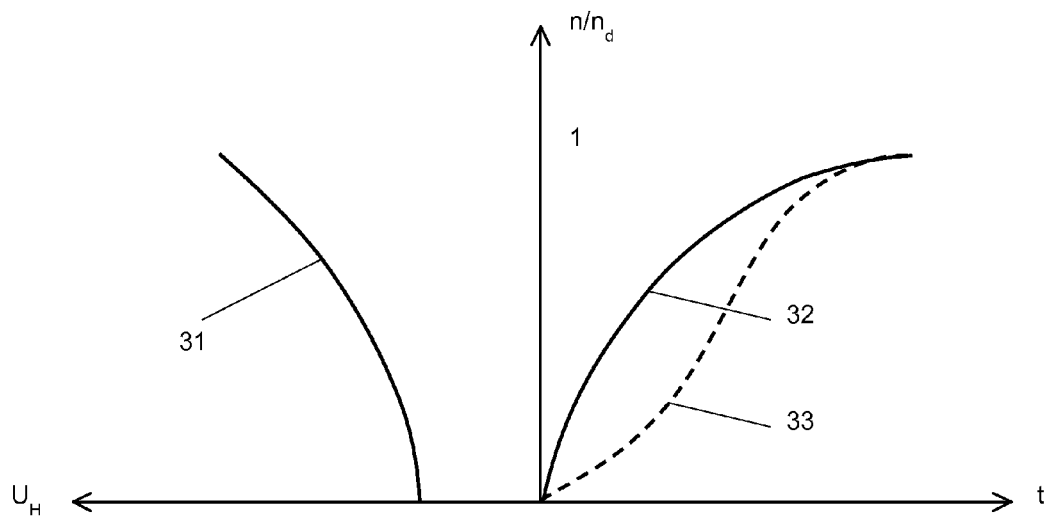
FIG. 5 shows the voltage amplitude of the auxiliary winding in relation to the speed and shows the speed in relation to time.

Based on the fundamental principles of asynchronous motors, the characteristic curve 31 of the voltage amplitude of the auxiliary winding $U_H$ can theoretically be shown compared to the speed $n/n_d$ on the left hand side of FIG. 5 and the course of the speed $n/n_d$ compared to time t on the right hand side of FIG. 5. In the case of the course of the speed $n/n_d$ compared to time t two possible courses 32, 33 are assumed. Two curves 34, 35 likewise emerge accordingly when showing the voltage amplitude of the auxiliary winding $U_H$ compared to time t according to FIG. 6.

Taking into consideration the properties of an asynchronous alternating current motor and the application of linear capacitors, the course of $U_H$ has the following characteristics:
- clearly increasing over time
- continuous and differentiable
- the second order derivative $d^2U_H/dt^2$ is a continuous function varying over time, i.e. not a constant.

Figure 6:
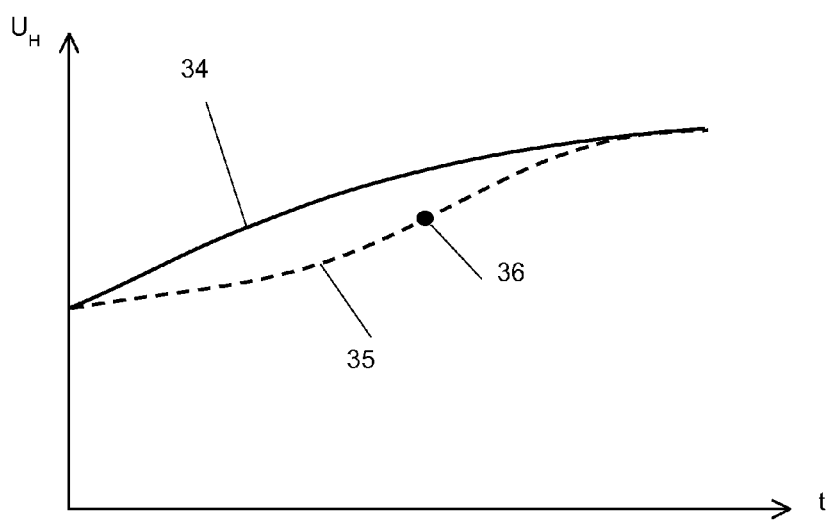
FIG. 6 shows the voltage amplitude of the auxiliary winding in relation to time according to FIG. 5.

Starting from these properties, the two curves 34 and 35 in FIG. 6 can each be described in more detail with the following mathematical models or function:

$$U_H = U_{H\infty} - (U_{H\infty} - U_{H0})e^{-t/\tau} \quad (1)$$

and $$U_H = \sum_{i=0}^{n} a_i t^i, n > 2 \quad (2)$$

respectively, $U_{H0}$ being the starting value of $U_H$ at t=0, $U_{H\infty}$ the final value of $U_H$ at t=∞ (infinite) and $a_i$ being constants. $\tau$ is the time constant of the first mathematical model (1) and a parameter of the dynamic process of the motor starting procedure.

The first mathematical model (1) is an exponential function and has no inflection point since its second order derivative never equals zero. Using the second mathematical model (2), all other time courses of $U_H$, which are not adequately approximated by the first mathematical model, can be described. The second mathematical model (2) has at least one inflection point 36. One of the two models can, however, already be sufficient if the course of $U_H$ and the dynamic process of the motor respectively are described adequately thereby.

Since the voltage amplitude of the auxiliary winding $U_H$ describes the dynamic process, reaching a predefined relative change in $U_H$, for example 80%, can be drawn upon as a suitable point in time for disconnecting the start capacitor. The point in time for disconnection is arrived at by solving the equation (1) or (2) respectively.

In the process, the following solution emerges according to equation (1) at a predefined relative change P:

$$t = -\tau \cdot \ln\frac{U_{H\infty} - U_H}{U_{H\infty} - U_{H0}} = -\tau \cdot \ln(1 - P) \quad (3)$$

where $$P = \frac{U_H - U_{H0}}{U_{H\infty} - U_{H0}}$$

is the relative change in $U_H$. At a predefined relative change in P=80% the point in time for disconnection is:

$$t = -\tau \ln(1-0.8) \approx 1.6\tau$$

At a predefined relative change of P=63.2% the point in time for disconnection would be exactly $\tau$.

The time constant $\tau$ is a parameter of the motor starting procedure and there is a dependence of component and operating parameters such as characteristics of the motor, capacitances of the capacitors, supply voltage, load torque, and other operating conditions which are often not known before activation and can subsequently change over time. This has the consequence that determining the time constant $\tau$ depending on the component and operating parameters is complicated and also not expedient.

Therefore, according to the invention, an algorithm is derived for determining the time constant $\tau$ directly from the course of $U_H$ with no knowledge of the individual component and operating parameters. For this purpose, the derivative functions of $U_H$ are generated:

$$\frac{dU_H}{dt} = \frac{1}{\tau}(U_{H\infty} - U_{H0})e^{-t/\tau} \quad (4)$$

and $$\frac{d^2 U_H}{dt^2} = -\frac{1}{\tau^2}(U_{H\infty} - U_{H0})e^{-t/\tau} \quad (5)$$

The time constant $\tau$ sought for the first mathematical model (1) is then obtained from (4) and (5):

$$\tau = -\left(\frac{dU_H}{dt} \bigg/ \frac{d^2 U_H}{dt^2}\right) \quad (6a)$$

or from (1) and (4) respectively by establishing the difference via any selected two points in time:

$$\tau = -\Delta U_H / \Delta \frac{dU_H}{dt} \quad (6b)$$

Figure 7:
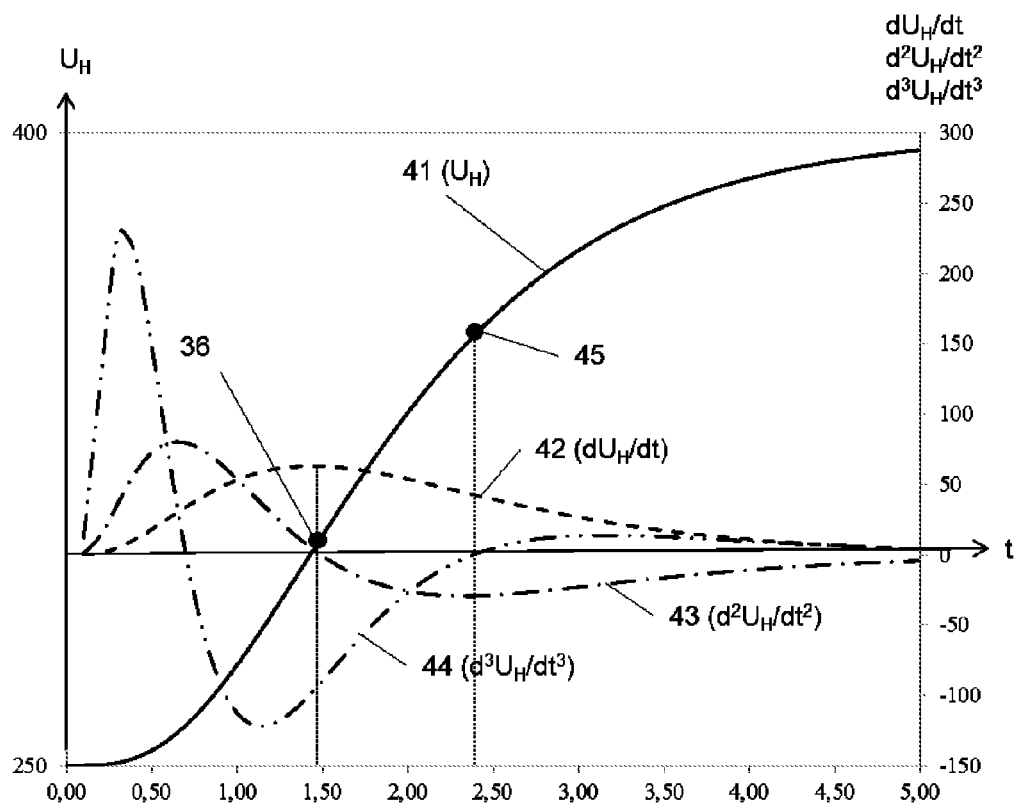
FIG. 7 shows the first, second and third derivatives of the voltage amplitude of the auxiliary winding.

Reference is made to FIG. 7 with regard to determining the point in time for disconnection according to the second mathematical model (2). In this figure, the course 41 of the voltage amplitude $U_H$ of the auxiliary winding according to function (2), its first derivative 42 ($dU_H/dt$), its second derivative 43 ($d^2U_H/dt^2$) and its third derivative 44 ($d^3U_H/dt^3$) are shown. The first derivative 42 ($dU_H/dt$) and the second derivative 42 ($d^2U_H/dt^2$) describe the increase (change) and the curve of their antiderivative $U_H$ respectively.

The negative zero crossing of the second derivative 43 ($d^2U_H/dt^2$) marks the inflection point 36 of the course 41 of the voltage amplitude $U_H$ with its upward trend, i.e. the rise of the course 41 of the voltage amplitude $U_H$ does continue but it becomes slower from this point in time. The negative value range of the second derivative 43 ($d^2U_H/dt^2$) after the inflection point 36 describes the continuation of the increase in value of the course 41 of the voltage amplitude $U_H$, which is becoming ever slower over time. At the positive zero crossing of the third derivative 44 ($d^3U_H/dt^3$) after the inflection point 36, the first derivative 42 ($dU_H/dt$) (the increase in value of $U_H$) has reached its inflection point, which is equivalent to the break point 45 on the antiderivative $U_H$. Both the inflection point 36 and the break point 45 are parameters, which describe the progress of the dynamic process. The time $t_{inflection\ point}$ at the inflection point 36, the time $t_{break\ point}$ at the break point 45 or the time as a function of both points in time:

$$t = A \bullet t_{inflection\ point} + B \bullet t_{break\ point} + C \quad (7)$$

can thus be defined as the point in time for disconnecting the start capacitor. Here A, B and C are any selected predefined constants.

The determination of the point in time for disconnecting the start capacitor according to the options described above has the following advantages:

Only the voltage amplitude of the auxiliary winding $U_H$ is measured. The measurement of further factors, such as the voltage of the main winding, is not necessary.

The time constant $\tau$ according to the first mathematical model in accordance with equation (1) and the inflection point 36 and the break point 45 according to the second mathematical model in accordance with equation (2) respectively are parameters of the voltage course $U_H$ of the auxiliary winding and thus also parameters of the dynamic process of the motor operation. Every change to component or operating parameters, such as the characteristics of the motor, capacitances of the capacitors, supply voltage, load torque and other operating conditions, is expressed in the parameters. That means that the point in time for disconnecting the start capacitor thus determined automatically compensates for such changes, which is not possible in the case of disconnecting criteria with fixed threshold values of time, current, voltage or phase shift as used in prior art.

An optimal starting procedure and an optimal operation of the motor emerge, also taking into consideration the component and operating parameters that change over time such as the capacitance of the capacitor or the current load of the motor. This optimisation also contributes to increasing the useful life of the capacitors, motor and equipment.

Possible damage to the capacitors, disconnecting devices, motor and equipment are prevented.

Figure 8:
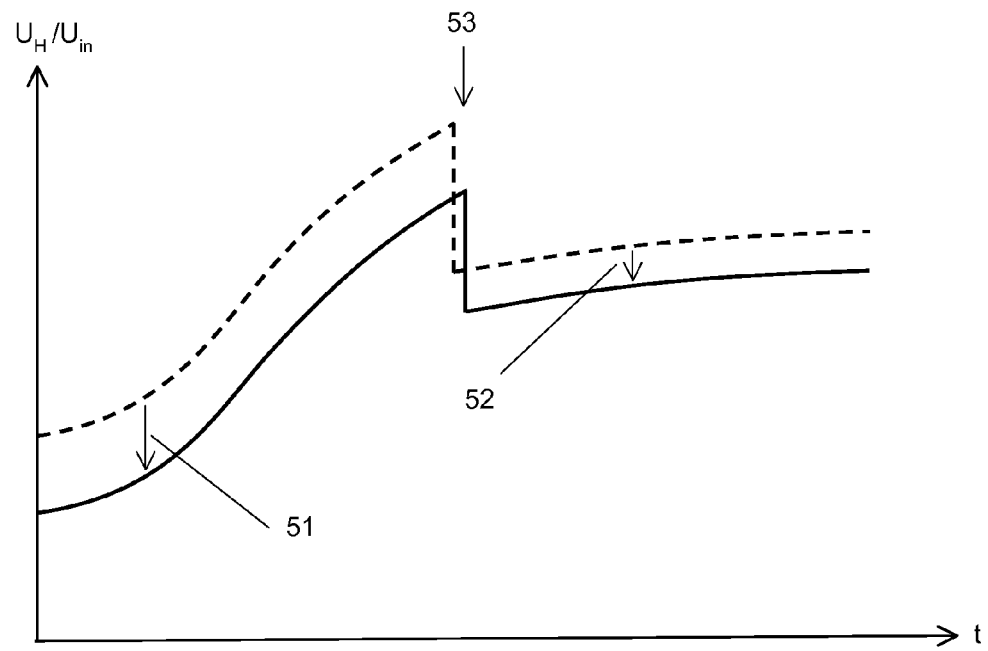
FIG. 8 shows the changes in the course of the voltage of the auxiliary winding resulting from changes in capacitance.

The capacitance of the capacitors often used in practice is subject to tough manufacturing tolerances and changes over time. In FIG. 8, the arrow 51 shows the change in the voltage course of the auxiliary winding as a result of a change in capacitance of the start capacitor before disconnecting the start capacitors. The arrow 52 shows the change in the voltage course of the auxiliary winding as a consequence of a change in capacitance of the run capacitor after disconnection of the start capacitors. The arrow 53 shows the changes in the voltage course of the auxiliary winding as a consequence of the disconnection of the start capacitor. An automatic adjustment at the point in time for disconnecting the start capacitor is achieved by the method presented here.

Moreover, there is a possibility of a status check (for example the capacitance change since the initial activation) or a calculation of the remaining useful life of the capacitors used and thus a timely service indicator for impending changes of capacitors. The following criteria can be set for this purpose for example:

$$\Delta C_{startup} = f\left(\frac{\Delta U_{H0}/U_{in}}{\Delta t}\right) \quad (8)$$

and $$\Delta C_{run} = f\left(\frac{\Delta U_{H\infty}/U_{in}}{\Delta t}\right) \quad (9)$$

where $\Delta C$: is the capacitance change of the capacitor,
$U_{in}$: is the supply voltage of the motor,
$U_{H0}$: is the starting value of $U_H$ at $t = 0$,
$U_{H\infty}$: is the final value of $U_H$ at $t = \infty$,
$\Delta U_{H0}/U_{in}$: is the relative change in the starting value $U_{H0}$ to the supply voltage $U_{in}$,
$\Delta U_{H\infty}/U_{in}$: is the relative change in the final value $U_{H\infty}$ to the supply voltage $U_{in}$,
$\frac{\Delta U_{H0}/U_{in}}{\Delta t}$: is the relative change over time of the starting value $U_{H0}$ and
$\frac{\Delta U_{H\infty}/U_{in}}{\Delta t}$: is the relative change over time of the final value $U_{H\infty}$.

The relative change to the supply voltage $U_{in}$ is used here to balance out the change dependent on the supply voltage $U_{in}$.

Moreover, critical motor statuses such as a locked rotor or an imminent motor stoppage can be detected by means of the measured voltage of the auxiliary winding.

The criterion for detecting a locked rotor upon motor start-up could be as follows:

$$dU_H/dt < \text{predefined threshold for a predefined period of time from motor start-up} \quad (10)$$

The criterion for detecting an imminent motor stoppage could be as follows:

$$dU_H/dt < 0 \text{ for a predefined period of time} \quad (11)$$

Effective protection of capacitors and disconnection devices used from damage resulting from excessive inrush currents, which arise as a result of insufficiently discharged capacitors, can be ensured by preventing a scheduled restart (via demand load) or an accidental restart (for example because of a power failure) if a delay time according to $$t = D \bullet \tau \quad (12)$$

and/or $$t = E \bullet \text{inflection point} \quad (13)$$

is complied with after every motor shut-off, D and E being predefined constants. The protection is particularly effective since the delay time is automatically adjusted to the current component or operating parameters by the formulae (12) and (13).

The invention claimed is:

1. A method for operating an asynchronous motor comprising a main winding and an auxiliary winding, wherein a start capacitor is connected in series with the auxiliary winding before the asynchronous motor is started up and is disconnected from the auxiliary winding at a point in time, which is to be determined, after the asynchronous motor is started up in that the voltage of the auxiliary winding is measured, at least one mathematical model is used, which models the voltage amplitude of the voltage of the auxiliary winding in relation to time and includes at least one determined parameter of the dynamic process of the motor starting procedure, wherein the determined parameter of the dynamic process of the motor starting procedure is calculated on the basis of the at least one mathematical model and the course of the amplitude or the effective value of the measured voltage of the auxiliary winding, and the point in time for disconnecting the start capacitor is determined by means of the determined parameter, wherein the at least one mathematical model comprises the following first mathematical model:

$$U_H = U_{H\infty} - (U_{H\infty} - U_{H0})e^{-t/\tau}$$

$U_{H0}$ being the starting value of the auxiliary winding ($U_H$) at t=0, $U_{H\infty}$ the final value of the auxiliary winding ($U_H$) at t=∞ a and τ being a time constant of the first mathematical model and constituting the determined parameter of the dynamic process of the motor starting procedure.

2. The method according to claim 1, characterised in that the determined parameter is determined with the first and/or a further derivative function ($d^n U_H/dt^n$) of the course of the amplitude or the effective value of the measured voltage of the auxiliary winding.

3. The method according to claim 1, characterised in that in order to determine the point in time for disconnecting the start capacitor, the time constant τ of the first mathematical model is determined and used by means of the first and second derivative functions ($dU_H/dt$, $d^2U_H/dt^2$) of the course of the amplitude or the effective value of the measured voltage of the auxiliary winding.

4. The method according to claim 1, characterised in that a change in capacitance of the run capacitor from activation and the remaining useful life of the run capacitor are determined by means of the change over time of the final value of the measured course of voltage of the auxiliary winding.

5. An asynchronous motor comprising a main winding, an auxiliary winding, a start capacitor and a control device, the control device being connected to a voltage measurement device for determining the course of the amplitude or the effective value of the measured voltage of the auxiliary winding and to a disconnecting device for disconnecting the start capacitor, characterised in that the control device is configured to determine the point in time for disconnecting the start capacitor in accordance with claim 1, and characterised in that the control device comprises means for determining the first and/or further derivative functions ($d^n U_H/dt^n$) of the course of the amplitude or the effective value of the measured voltage of the auxiliary winding as well as means for determining the point in time for disconnecting the start capacitor on the basis of the first and/or further derivative functions ($d^n U_H/dt^n$)

of the course of the amplitude or the effective value of the measured voltage of the auxiliary winding.

6. A method for operating an asynchronous motor comprising a main winding and an auxiliary winding, wherein a start capacitor is connected in series with the auxiliary winding before the asynchronous motor is started up and is disconnected from the auxiliary winding at a point in time, which is to be determined, after the asynchronous motor is started up in that the voltage of the auxiliary winding is measured, at least one mathematical model is used, which models the voltage amplitude of the voltage of the auxiliary winding in relation to time and includes at least one determined parameter of the dynamic process of the motor starting procedure, wherein the determined parameter of the dynamic process of the motor starting procedure is calculated on the basis of the mathematical model and the course of the amplitude or the effective value of the measured voltage of the auxiliary winding, and the point in time for disconnecting the start capacitor is determined by means of the determined parameter, wherein the at least one mathematical model comprises the following first mathematical model:

$$U_H = \sum_{i=0}^{n} a_i t^i,$$

where n>2, $U_{H0}$ is the starting value of the auxiliary winding ($U_H$) at t=0, $U_{H\infty}$ is the final value of the auxiliary winding ($U_H$) at t=∞ and $a_i$ are constants.

7. The method according to claim 6, characterised in that in order to determine the point in time for disconnecting the start capacitor, at least one inflection point of the first mathematical model, which constitutes the determined parameter of the dynamic process of the motor starting procedure, is determined and used by means of the first and second derivative functions ($dU_H/dt$, $d^2U_H/dt^2$) of the course of the amplitude or the effective value of the measured voltage of the auxiliary winding.

8. The method according to claim 7, characterised in that the inflection point of the course of the amplitude or the effective value of the measured voltage of the auxiliary winding is determined by means of the maximum of the first derivative function ($dU_H/dt$) of the course of the amplitude or the effective value of the measured voltage of the auxiliary winding or by means of the negative zero crossing of the second derivative function ($d^2U_H/dt^2$) of the course of the amplitude or the effective value of the measured voltage of the auxiliary winding.

9. The method according to claim 6, characterised in that in order to determine the point in time for disconnecting the start capacitor furthermore a break point of the first mathematical model is determined and used by means of the first, the second and the third derivative functions ($dU_H/dt$, $d^2U_H/dt^2$, $d^3U_H/dt^3$) of the course of the amplitude or the effective value of the measured voltage of the auxiliary winding.

10. A method for operating an asynchronous motor comprising a main winding and an auxiliary winding, wherein a start capacitor is connected in series with the auxiliary winding before the asynchronous motor is started up and is disconnected from the auxiliary winding at a point in time, which is to be determined, after the asynchronous motor is started up in that the voltage of the auxiliary winding is measured, at least one mathematical model is used, which models the voltage amplitude of the voltage of the auxiliary winding in relation to time and includes at least one determined parameter of the dynamic process of the motor starting procedure, wherein the determined parameter of the dynamic process of the motor starting procedure is calculated on the basis of the mathematical model and the course of the amplitude or the effective value of the measured voltage of the auxiliary winding, and the point in time for disconnecting the start capacitor is determined by means of the determined parameter, wherein a deviation above or below a predefined threshold value of the derivative function of the $n^{th}$ order ($d^n U_H/dt^n$) of the course of the amplitude or the effective value of the measured voltage of the auxiliary winding is used as a criterion for disconnecting the start capacitor.

11. A method for operating an asynchronous motor comprising a main winding and an auxiliary winding, wherein a start capacitor is connected in series with the auxiliary winding before the asynchronous motor is started up and is disconnected from the auxiliary winding at a point in time, which is to be determined, after the asynchronous motor is started up in that the voltage of the auxiliary winding is measured, at least one mathematical model is used, which models the voltage amplitude of the voltage of the auxiliary winding in relation to time and includes at least one determined parameter of the dynamic process of the motor starting procedure, wherein the determined parameter of the dynamic process of the motor starting procedure is calculated on the basis of the mathematical model and the course of the amplitude or the effective value of the measured voltage of the auxiliary winding, and the point in time for disconnecting the start capacitor is determined by means of the determined parameter, wherein in order to detect critical motor statuses, the first derivative function ($dU_H/dt$) of the course of the amplitude or the effective value of the measured voltage of the auxiliary winding is used, a critical motor status being reached if the first derivative function ($dU_H/dt$) of the course of the amplitude or the effective value of the measured voltage of the auxiliary winding has not exceeded a predefined threshold in a predefined period of time from the start-up of the asynchronous motor and/or the first derivative function ($dU_H/dt$) of the course of the amplitude or the effective value of the measured voltage of the auxiliary winding (2) remains at <0 for a predefined period of time.

12. A method for operating an asynchronous motor comprising a main winding and an auxiliary winding, wherein a start capacitor is connected in series with the auxiliary winding before the asynchronous motor is started up and is disconnected from the auxiliary winding at a point in time, which is to be determined, after the asynchronous motor is started up in that the voltage of the auxiliary winding is measured, at least one mathematical model is used, which models the voltage amplitude of the voltage of the auxiliary winding in relation to time and includes at least one determined parameter of the dynamic process of the motor starting procedure, wherein the determined parameter of the dynamic process of the motor starting procedure is calculated on the basis of the mathematical model and the course of the amplitude or the effective value of the measured voltage of the auxiliary winding, and the point in time for disconnecting the start capacitor is determined by means of the determined parameter, wherein a change in capacitance from activation of the start capacitor and the remaining useful life of the start capacitor are determined by means of the change over time of the starting value of the course of the amplitude or the effective value of the measured voltage of the auxiliary winding.

\* \* \* \* \*